United States Patent
Baik et al.

(10) Patent No.: US 10,282,851 B2
(45) Date of Patent: May 7, 2019

(54) VIDEO ANALYSIS METHOD AND APPARATUS AND COMPUTER PROGRAM

(71) Applicant: SAMSUNG SDS CO., LTD., Seoul (KR)

(72) Inventors: Eil Woo Baik, Seoul (KR); Ki Woon Sung, Seoul (KR); Jae Seok Lee, Seoul (KR); Kyu Sang Lee, Seoul (KR); Seung Woo Nam, Seoul (KR); Hyung Joo Mo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/798,556

(22) Filed: Oct. 31, 2017

(65) Prior Publication Data

US 2018/0122087 A1    May 3, 2018

(30) Foreign Application Priority Data

Oct. 31, 2016 (KR) .......................... 10-2016-0143120

(51) Int. Cl.
*G06T 7/246* (2017.01)
*G06K 9/00* (2006.01)
*G06K 9/68* (2006.01)
*G06K 9/62* (2006.01)

(52) U.S. Cl.
CPC .......... *G06T 7/248* (2017.01); *G06K 9/00718* (2013.01); *G06K 9/624* (2013.01); *G06K 9/68* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2003/0147466 A1* | 8/2003 | Liang | ................... | H04N 19/172 375/240.12 |
| 2008/0057913 A1* | 3/2008 | Sinha | ................... | H04L 63/1416 455/414.1 |
| 2009/0041114 A1* | 2/2009 | Clark | ................... | H04L 43/0829 375/240.01 |
| 2010/0124271 A1* | 5/2010 | Martz | ................ | H04N 7/17336 375/240.01 |

* cited by examiner

*Primary Examiner* — Bernard Krasnic
(74) *Attorney, Agent, or Firm* — Sughrue Mion, PLLC

(57) ABSTRACT

Provided is a video analysis (VA) method comprises calculating, by a VA apparatus, a size of each of a plurality of frames by summing sizes of a plurality of packets constituting each of the plurality of frames, analyzing, by the VA apparatus, the size of each of the plurality of frames constituting a video to determine a pattern of the sizes of the plurality of frames and determining, by the VA apparatus, whether there is a motion in the video based on the size pattern.

13 Claims, 12 Drawing Sheets

No Motion

Motion Appeared

FIG. 7A

=== Cross-validation ===

=== Summary ===

| | | |
|---|---|---|
| Correlation coefficient | 0.7379 | 0.8606 (False Negative: 96.5%) |
| Class complexity I oder 0 | 843.2051 bits | 0.9549 bits/instance |
| Class complexity I scheme | 1133.3238 bits | 1.2835 bits/instance |
| Complexity improvement (Sf) | -290.1187 bits | -0.3286 bits/instance |
| Mean absolute error | 0.4673 | |
| Root mean squared error | 0.7583 | |
| Relative absolute error | 52.4554 % | |
| Root erlative squared error | 67.5144 % | |
| Total Number of Instances | 883 | |

FIG. 7B

| Accuracy | Description |
|---|---|
| >90 | Excellent |
| 80~90 | Very High |
| 70~80 | Good |
| 60~70 | Moderate |
| 51~60 | Reasonable/Acceptable |

FIG. 7C

| Mode | Accuracy |
|---|---|
| Open | 71~74% |
| Encryption | 67.03% ~ 70.73% (94.23% to original ver.) |

VIDEO ANALYSIS METHOD AND APPARATUS AND COMPUTER PROGRAM

This application claims priority Korean Patent Application No. 10-2016-0143120 filed on Oct. 31, 2016 in the Korean Intellectual Property Office, the disclosure of which is incorporated herein by reference in its entirety.

BACKGROUND

1. Field of the Disclosure

The present disclosure relates to an apparatus and method for detecting a motion by analyzing a pattern of network packets of a real-time video streaming service, and more particularly, to a method of monitoring network packets of a real-time video streaming service and detecting whether there is a motion in the video by analyzing a pattern of packets and an apparatus for performing the method.

2. Description of the Related Art

Related methods of receiving a video from a network camera in real time, such as a closed-circuit television (CCTV), and detecting a motion by analyzing the received video are mostly based on processing at a receiving terminal.

A receiving terminal receives a real-time video as packets from a camera via a network. Also, the receiving terminal performs video decoding on the received packets according to a codec of the video. Further, the receiving terminal determines a region having a change in individual images constituting the video. In other words, according to most related video analysis (VA) methods, two images constituting a video are compared to detect a region having a change, and it is determined accordingly whether there is a motion.

Like this, according to a related VA method, a terminal receiving a video decodes and displays the video on a screen and identifies an accurate motion by reinterpreting images on the screen. However, this requires high computing power.

Devices with general performance merely have a throughput of 3 frames per second (FPS) to 7 FPS. The throughput is a throughput when the devices process a stored video. Assuming that the devices do not process a stored video but receive and process a video in real time, the throughput becomes lower than 3 FPS to 7 FPS. However, even the throughput of about 3 FPS to 7 FPS is insufficient to detect and process a motion in a real-time video of about 30 FPS.

Also, related methods essentially involve a video decoding process and thus cause dependency of a video application in encoding and decoding processes. In other words, a decoding method to be used by a video receiver is determined according to an encoding method used by a video transmitter, and a device for analyzing the video is also affected by the encoding method. In some cases, it is necessary to replace a device for analyzing a video.

Consequently, there is a necessity of a method for simply detecting a motion in a video without requiring high computing power. Also, there is a necessity of a method for detecting a motion in a video regardless of a codec of the video.

SUMMARY

Aspects of the present disclosure provide an apparatus and method for detecting a motion by analyzing a pattern of network packets of a real-time video streaming service.

It should be noted that objects of the present invention are not limited to the above-described objects, and other objects of the present invention will be apparent to those skilled in the art from the following descriptions.

According to an aspect of the inventive concept, there is provided a video analysis (VA) method comprises calculating, by a VA apparatus, a size of each of a plurality of frames by summing all sizes of a plurality of packets constituting each of the plurality of frames, analyzing, by the VA apparatus, the size of each of the plurality of frames constituting a video to determine a size pattern of the plurality of frames and determining, by the VA apparatus, whether there is a motion in the video based on the size pattern.

According to another aspect of the inventive concept, there is provided a video analysis (VA) apparatus comprises a memory configured to store a computer program and at least one processor configured to read and execute the computer program, wherein the computer program comprises frame size calculating instructions configured to cause the at least one processor to calculate a size of a frame by summing all sizes of a plurality of packets constituting the frame and motion detection instructions configured to cause the at least one processor to analyze a pattern of sizes of a plurality of frames constituting a video by analyzing the size of each of the plurality of frames, and determine whether there is a motion in the video based on the pattern.

According to another aspect of the inventive concept, there is provided a non-transitory computer-readable medium having stored thereon a computer program, which when executed by a processor a video analysis (VA) apparatus, causes the VA apparatus to calculate a size of a frame by summing a size of each of a plurality of packets constituting the frame, analyze a pattern of sizes of a plurality of frames constituting a video by analyzing the size of each of the plurality of frames and determine whether there is a motion in the video based on the pattern.

BRIEF DESCRIPTION OF THE DRAWINGS

The above and other aspects and features of the present disclosure will become more apparent by describing in detail exemplary embodiments thereof with reference to the attached drawings, in which:

FIGS. 7A to 7C illustrate experimental results of a VA method according to an exemplary embodiment of the present disclosure;

DETAILED DESCRIPTION OF THE EMBODIMENTS

Hereinafter, the present disclosure will be described in further detail with reference to the accompanying drawings.

Figure 1:
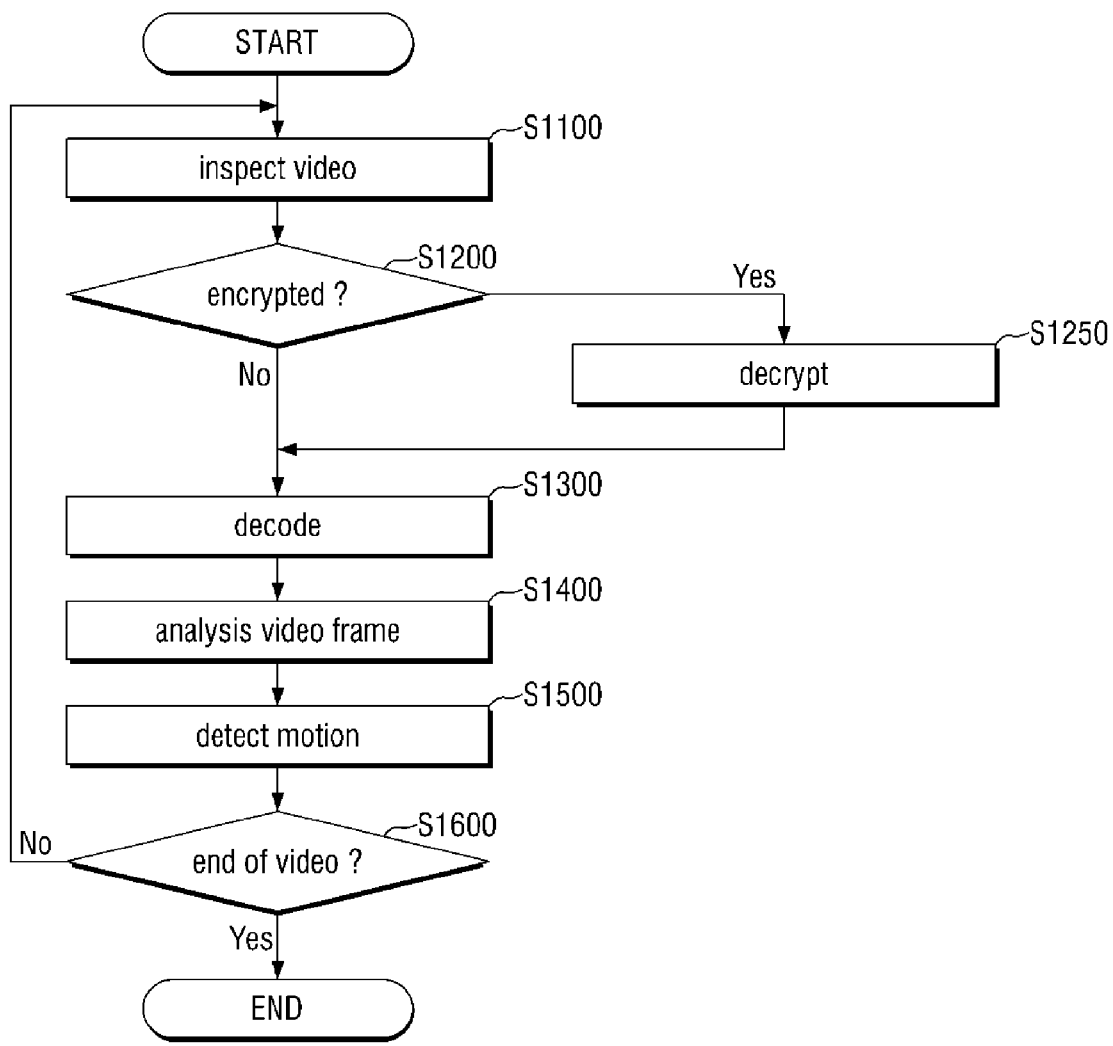
FIG. 1 is a flowchart illustrating a related video analysis (VA) method.

FIG. 1 is a flowchart illustrating a related video analysis (VA) method.

Referring to FIG. 1, a VA apparatus determines whether packets of a video have been encrypted (S1200) while monitoring the video (S1100). When the packets of the video have been encrypted, an operation of decrypting the encrypted packets is performed first (S1250). Next, video decoding is performed according to a codec of the video (S1300).

When the video is decoded, it is possible to check images constituting the video. The video is actually a series of images referred to as frames. A video of 30 FPS causes an optical illusion as if an object moves by sequentially exposing 30 images per second. Therefore, it is possible to determine whether there is a motion by analyzing the frames constituting the video (S1400).

For example, when images of two consecutive frames are compared, a background does not change, but only a moving object changes in position or shape. In this way, by analyzing a difference between images, it is possible to identify which object has moved, what kind of motion the object has made, and the like (S1500). Subsequently, when the video has not ended yet (S1600), VA is performed on a next frame in the same way (S1100).

Related VA requires high computing power. First, the operation of decoding the packets of the video transmitted via a network (S1300) requires high computing power. Also, the operation of comparing images of the video (S1400) requires high computing power. Further, when the packets of the video are encrypted for security and transmitted via the network, the operation of decrypting the encrypted packets (S1250) also requires high computing power. Accordingly, related VA has throughput limitations in analyzing and processing a video in real time.

Also, the related VA method essentially involves the operation of decoding the video (S1300) and thus is dependent on a codec of the video. In other words, when it is not possible to decode the video with a device for analyzing a video, it is necessary to install the codec or replace the device. Also, some codecs may require the cost of license.

Like this, a related method of detecting a motion by analyzing a video has limitations in real-time processing. In other words, the greatest weakness of the related method is that it is difficult to apply the related method in real time due to heavy video processing and computing workloads. For this reason, it is difficult to apply a VA function to a transmitting end, and it is possible to apply the VA function only to a receiving end. However, it is also difficult to perform VA applied to a receiving end in real time.

For example, a related video streaming technology makes it possible to transmit a screen at 30 FPS to 60 FPS, but a receiving terminal which actually receives the screen is not able to process the screen at 30 FPS to 60 FPS. Related VA methods have throughput limitations of about 3 FPS to 7 FPS.

To solve this problem, it is necessary to minimize the operations S1250, S1300, and S1400 requiring high computing power. In particular, when it is possible to detect a motion without the operation of decoding a video S1300, codec dependency is lowered, and also real-time VA is possible.

Figure 2:
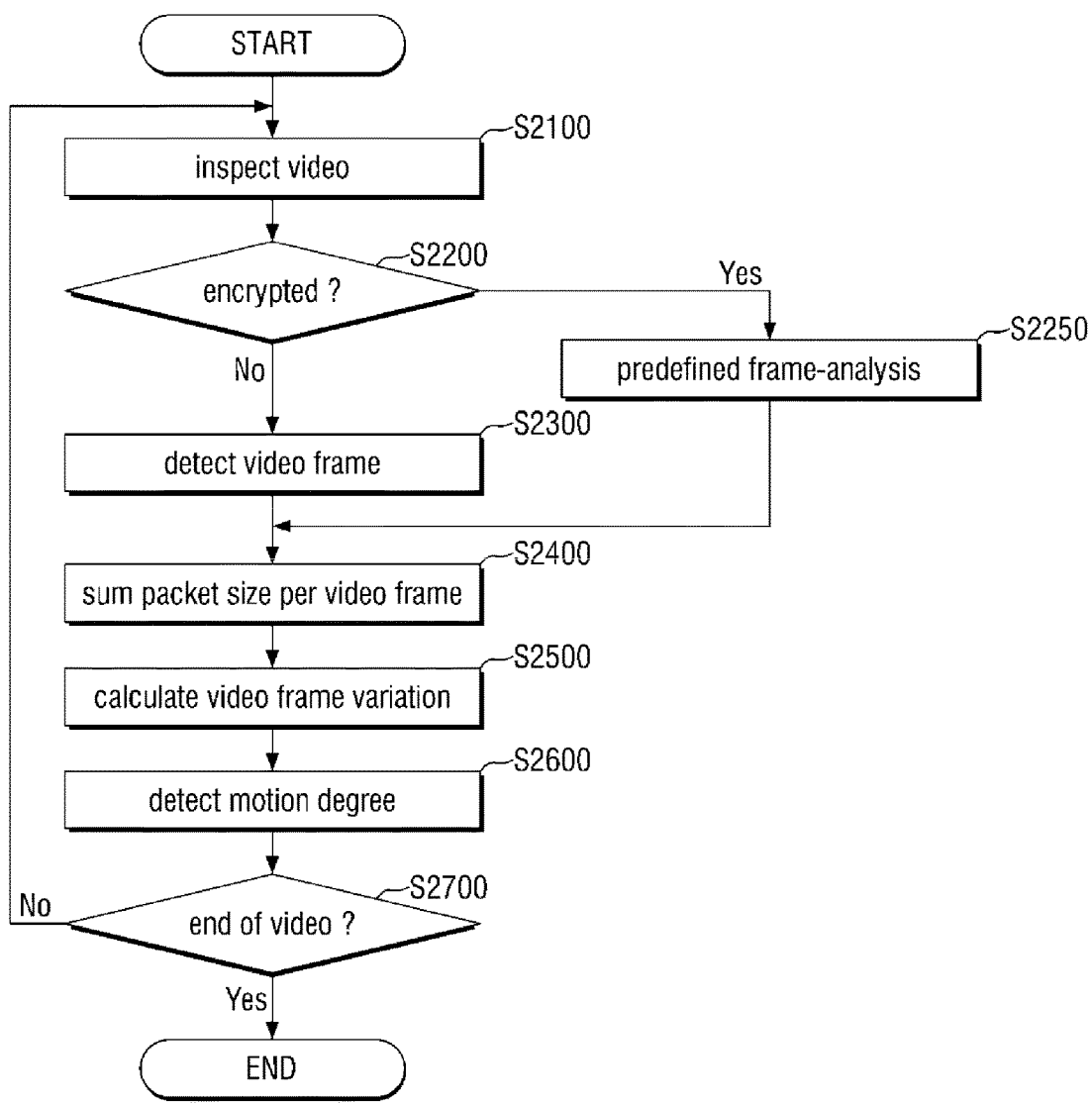
FIG. 2 is a flowchart illustrating a method of detecting a motion on the basis of pattern analysis of network packets of a real-time video streaming service according to an exemplary embodiment of the present disclosure.

FIG. 2 is a flowchart illustrating a method of detecting a motion on the basis of pattern analysis of network packets of a real-time video streaming service according to an exemplary embodiment of the present disclosure.

Referring to FIG. 2, a VA apparatus determines whether packets of a video have been encrypted (S2200) while monitoring the video (S2100). This is the same as the operations of FIG. 1, but according to the present disclosure, even when the packets of the video have been encrypted, the operation of decrypting the encrypted packets S1250 is not performed. Instead, the VA apparatus recognizes frames on the basis of predefined frame analysis information (S2250).

When the packets of the video have not been encrypted, the VA apparatus recognizes frames by reading frame information from the packets of the video (S2300). The operation S2300 may be performed without decoding the video. In other words, even without decoding the video, it is possible to determine data of which frame a corresponding packet is, how many packets constitute one frame, and the like through metadata of the packet.

When frames are recognized, the VA apparatus calculates sizes of the frames by summing sizes of packets constituting each of the frames (S2400). A size of a packet indicates the number of bytes of the packet. In other words, when the packets are arranged to transmit the video in real time, it is possible to know packets of which number to which number constitute one frame through packet information, and when all sizes of the packets constituting the frame are summed up, it is possible to know a size of the frame.

Needless to say, there is no information in a frame size. A frame size is merely a number and thus does not indicate what kind of image is in a corresponding frame or what kinds of background and foreground are shown. However, it is possible to very simply calculate a frame size by merely summing packet sizes.

After calculating the sizes of the frames, the VA apparatus calculates a change in the sizes of the consecutive frames (S2500). In other words, a pattern of the frame sizes is analyzed. This is also simple analysis of a pattern of a series of numbers and thus may be performed with very lower computing power than the operation of comparing images of frames (S1400) in FIG. 1.

When a pattern of the frame sizes is analyzed, the VA apparatus detects a motion by using the pattern (S2600). Unlike the operation of detecting a motion (S1500) in FIG. 1, in this way, it is not possible to identify what kind of motion has been made. However, it is possible to determine whether there has been a motion and the degree of motion. When the video has not ended yet (S2700), VA is performed on a next frame in the same way (S2100).

The operation of determining whether there has been a motion by using a pattern of frame sizes (S2500) will be described in detail with reference to FIGS. 3A and 3B. Also, the operation of determining the degree of motion by using a pattern of frame sizes (S2600) will be described in detail with reference to FIGS. 5A to 6. The operation of recognizing the frames on the basis of predefined frame analysis information (S2250) when the packets of the video have been encrypted will be described in detail with reference to FIGS. 4A and 4B.

In comparison with FIG. 1, it is possible to see that the operation of decrypting encrypted packets of a video (S1250), the operation of decoding the video (S1300), and the operation of comparatively analyzing images of frames (S1400) are omitted in FIG. 2. In this way, it is possible to detect a motion with low computing power.

The operation of decrypting encrypted packets of a video (S1250) is replaced by the operation of applying a predefined frame analysis method (S2250). The operation of decoding the video (S1300) is replaced by the operation of calculating frame sizes (S2400). The operation of comparatively analyzing the images of the frames (S1400) is replaced by the operation of calculating a pattern of frame sizes (S2500).

As shown in FIG. 2, since the method proposed in the present disclosure makes it possible to detect a motion with low computing power, the method may be applied to a transmitting terminal of a network camera such as a closed-circuit television (CCTV) or a receiving terminal of a related VA apparatus. Also, the method may be used in parallel with a related method.

When the method is applied to a transmitting terminal, a camera may capture a video, determine whether there is a motion before transmitting the video in real time via a network, drop frames with no motion, and transmit other frames. According to an experimental result, when a camera captures a video whose about 30% time length has a motion and whose about 70% time length has no motion, the camera may reduce about 50% of the amount of network data.

Also, when the method is applied to a receiving terminal, a video is received from a network camera, and frames with no motion may be dropped before the video is stored, so that storage efficiency of a storage may be improved. According to the above experimental result, when a data amount is reduced to about 50%, it is possible to reduce a total monthly cost of storing videos generated by 100 cameras from 4,500 dollars to 2,300 dollars, that is, about 50%, in terms of Amazon's storage cost of 3 cents per gigabyte.

Further, the method proposed in the present disclosure may be used in parallel with a related method. For example, an object recognition device with high computing power may process about 5 FPS. When frames with no motion are dropped from a 30-FPS video captured by a camera and only frames with a motion are selected and transferred to the object recognition device, it is possible to process the 30-FPS video captured by the camera even with the object recognition device, that is, the throughput of about 5 FPS. Therefore, it is possible to maximize performance of the related VA device.

Moreover, since a motion is determined regardless of a codec by using a pattern of frame sizes, the method may be applied regardless of a type of codec used by a related system. In other words, the method is applied to packets at a network level and thus easily implanted into a previously constructed existing system, such as a camera and the like. Therefore, the method may be easily applied to the development of solutions for video security of a smart home and CCTV transmission, and it is possible to expect a reduction in time period for a solution quality test and a reduction in solution development cost based on real-time quality evaluation.

To sum up, it is possible to improve network efficiency and reduce the cost of storage without lowering a recognition rate which is the most important. Also, by selectively analyzing video frames, it is possible to expect a higher recognition rate, which is lowered in a low bandwidth, and to overcome limitations of a video end (i.e., a camera) with a low processing rate.

Figure 3A:
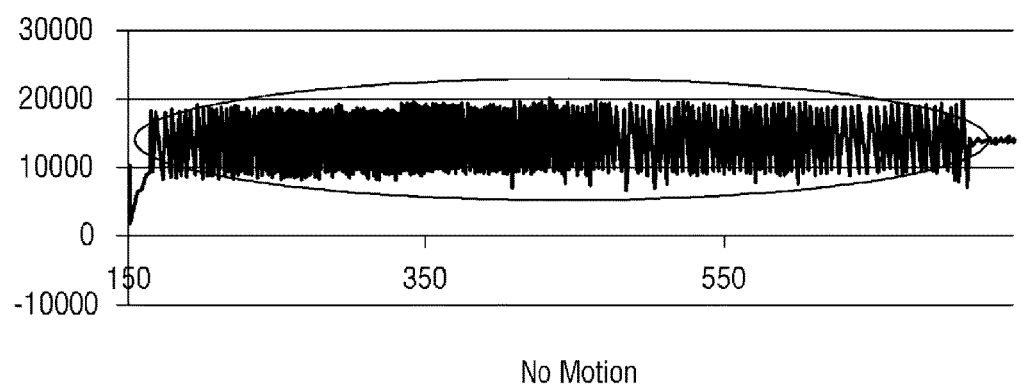
FIGS. 3A and 3B are graphs illustrating a process of detecting a motion on the basis of a pattern of frame sizes according to an exemplary embodiment of the present disclosure.
Figure 3B:
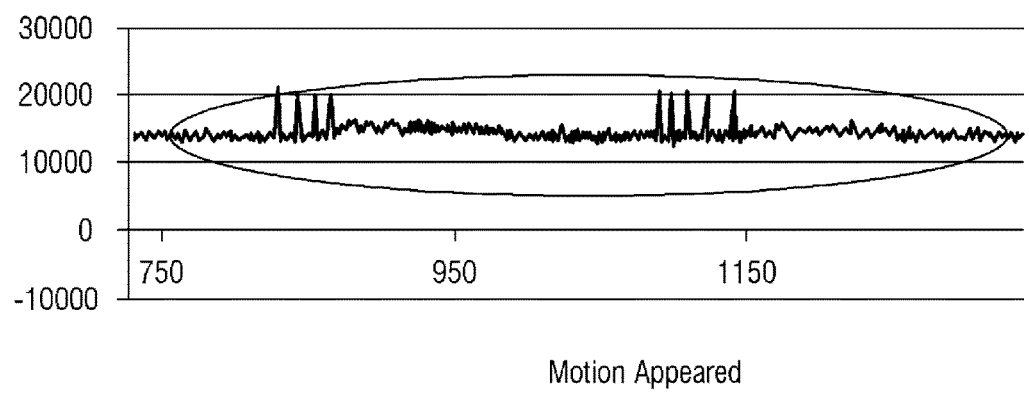

FIGS. 3A and 3B are graphs illustrating a process of detecting a motion on the basis of a pattern of frame sizes according to an exemplary embodiment of the present disclosure.

When video packets are checked in a network via which the packets are transmitted, it is possible to distinguish a start and an end of a video frame. This is because video packets have a marking which indicates an end of a frame regardless of type of codec. In other words, it is possible to identify packets constituting a frame without decoding the packets into a video. Packets constituting frames are identified, and sizes of video packets are summed for each frame.

A motion in a video screen correlates with sizes of video packets in frames due to a video codec and the principle of compression. In other words, a motion in a video screen has influence on packet sizes and frames sizes. Therefore, in a reverse manner, it is possible to approximately estimate information on a motion in a screen by considering a change in frame size.

Frame sizes are shown as graphs in FIGS. 3A and 3B. The horizontal axes of FIGS. 3A and 3B denote time, and the vertical axes denote frame size. FIG. 3A is a graph of frame size from 150 seconds to 700 seconds, and FIG. 3B is a graph of frame size from 750 seconds to 1300 seconds.

Referring to FIG. 3A, it is possible to see that a frame size regularly varies between 10,000 and 20,000. On the other hand, referring to FIG. 3B, it is possible to see that a frame size is mainly about 15,000 and intermittently becomes 20,000. When the video is decoded and analyzed, FIG. 3A is a graph when there is no motion, and FIG. 3B is a graph when there is a motion.

Like this, an actual video shows a clear difference between a case in which there is no motion and a case in which there is a motion. As shown in FIG. 3A, when there is no motion in a screen, a result of encoding a screen with no motion shows a large difference between frame sizes. Since it is not possible to know when a change will be made if there is no motion in the screen, the VA apparatus waits for a change while capturing the video screen to continuously store content of an overall size at short intervals. Referring to FIG. 3A, a frame size periodically decreases and increases in the entire section from 150 seconds to 700 seconds.

Then, when a motion appears, all consecutive video frames following the motion are connected on the basis of compression. As shown in FIG. 3B, video frames having a small size difference are generated. In FIG. 3B, most frames have similar sizes, and only some frames have large sizes. A section in which frames have similar sizes denotes that a motion has occurred to a certain degree. Four frames between 750 seconds and 950 seconds and five frames between 950 seconds and 1150 seconds whose sizes suddenly increase denote that the degree of motion has suddenly increased.

In this way, it is possible to recognize and determine whether there is a motion and the degree of motion by using a pattern of variations in video frame size, periods, intervals, and the like of video frames rather than absolute sizes of the video frames. In other words, it is possible to identify whether there is a motion and the degree of motion on the basis of statistics, such as an average and a variance of video frame sizes. This is summarized as the following table.

TABLE 1

|  | Case in which there is no motion (FIG. 3A) | Case in which there is a motion (FIG. 3B) |
| --- | --- | --- |
| Period | Periodic | Aperiodic |
| Average | Similar to the average of a minimum and a maximum | Similar to a minimum |
| Variance | Small | Large |

To sum up, sizes of video frames are calculated, and when the frame sizes have a pattern of periodically repeated maximums and minimums, it is determined that there is no motion. Alternatively, when a difference in size between consecutive first and second frames is smaller than a threshold value, it is determined that there is no motion. Alternatively, when a variance is smaller than a threshold value, it is determined that there is no motion.

On the other hand, when the frame sizes have a pattern of repeated minimums and maximums are shown in only some frames, it is determined that there is a motion. Alternatively, when a difference in size between consecutive first and second frames is equal to or larger than the threshold value, it is determined that there is a motion. Alternatively, when the variance is equal to or larger than the threshold value, it is determined that there is a motion.

Figure 4A:
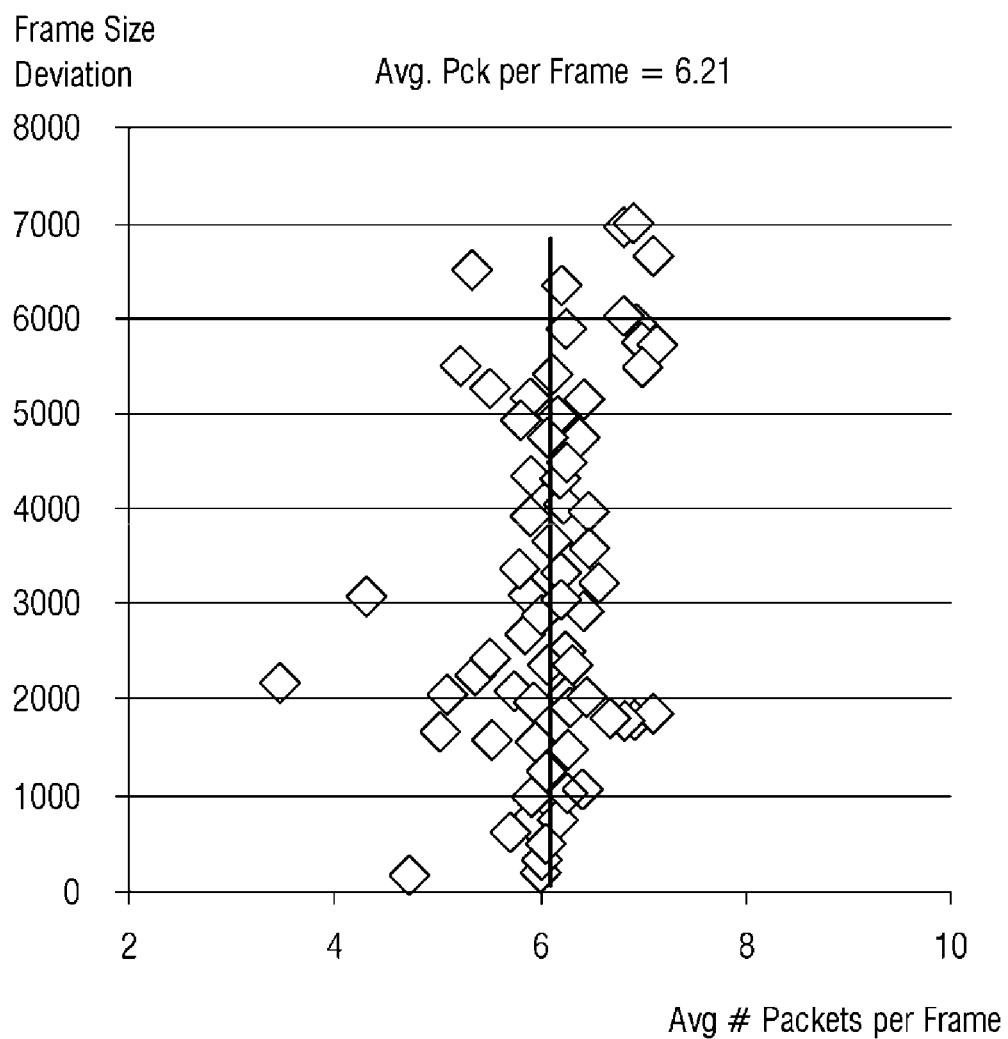
FIGS. 4A and 4B are graphs illustrating a process of detecting a size of a frame according to an exemplary embodiment of the present disclosure when packets are encrypted.
Figure 4B:
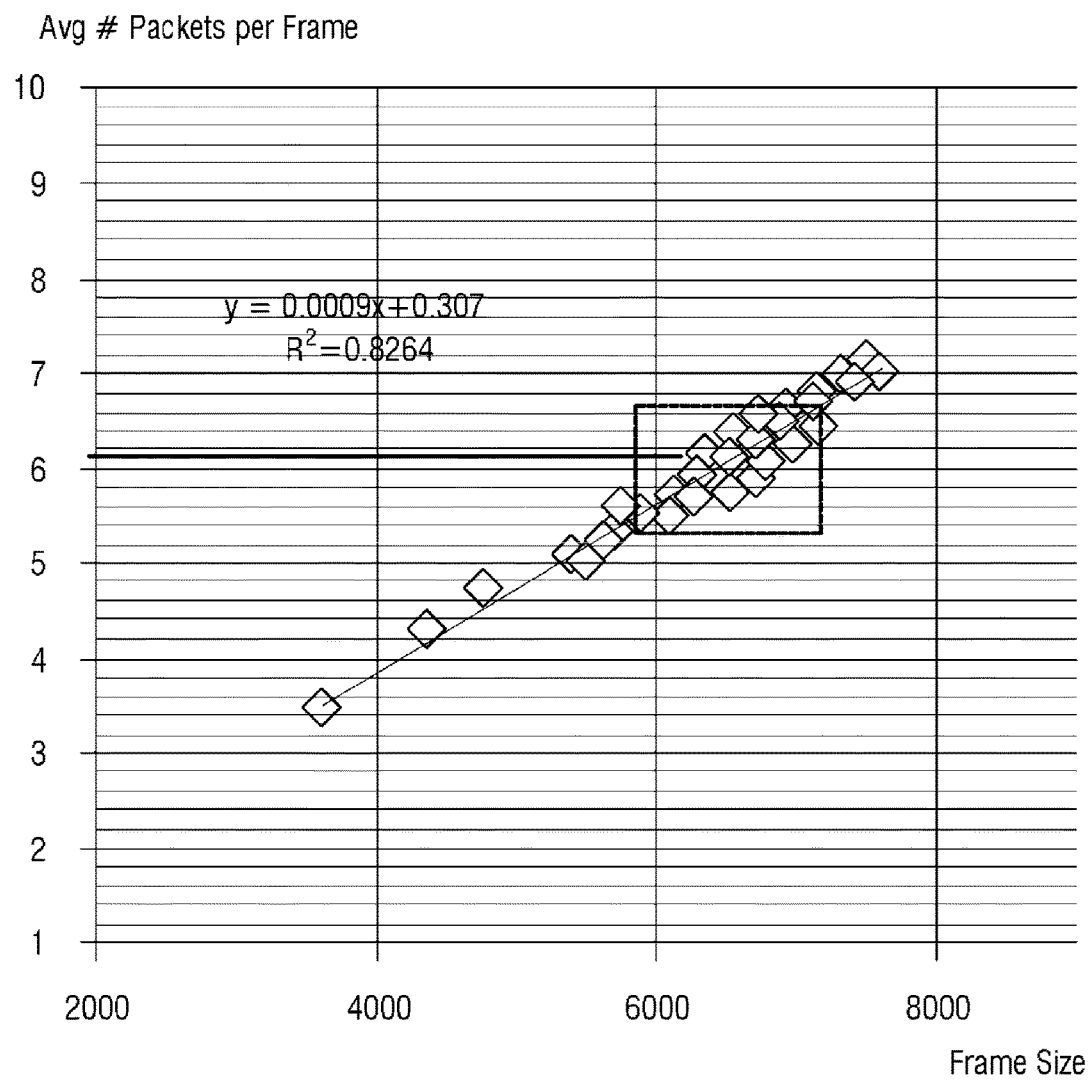

FIGS. 4A and 4B are graphs illustrating a process of detecting a size of a frame according to an exemplary embodiment of the present disclosure when packets are encrypted.

In the above description of FIG. 2, the operation of calculating a frame size by using a predefined frame analysis method (S2250) is performed when packets have been encrypted.

When packets have not been encrypted, it is possible to know packets constituting a frame through a marking, which indicates an end of the frame, in a packet and calculate a size of the frame by summing sizes of the packets. However, when packets have been encrypted, it is not possible to know a marking, which indicates an end of a frame, unless the encrypted packets are decrypted, and thus it is not possible to know which packets constitute one frame.

Then, it is not possible to calculate frame sizes. Therefore, there is a necessity of a method for calculating a frame size even when packets are encrypted. To this end, machine learning is used in advance to learn the number of packets per frame. In other words, when video packets are encrypted and it is not possible to know a start and an end of a video frame, the previously learned number of packets per frame is used to recognize the corresponding number of packets as a video frame and calculate a frame size.

Referring to FIG. 4A, a result of machine learning of the number of packets per frame is shown. In FIG. 4A, the horizontal axis denotes the number of packets per frame, and the vertical axis denotes a frame size. As shown in FIGS. 3A and 3B, frame sizes may have various patterns depending on whether there is a motion. However, as shown in FIG. 4A, even when frame sizes have a variety of values, frame-specific numbers of packets tend to be uniform.

Referring to FIG. 4A, frame sizes have various values from 0 to 7000, but frame-specific numbers of packets are approximately 6. It is possible to obtain 6.21 by actually averaging data. Even when packets are encrypted, packet sizes may increase due to encryption, but the number of packets does not change. Therefore, it is possible to use the number of packets.

Encryption is performed in units of packets, and a packet size may increase due to the encryption compared to the packets before the encryption. However, even when the encryption is performed, the number of packets does not change. Therefore, a result of machine learning like in FIG. 4A may be used to calculate a frame size even when packets have been encrypted.

To sum up, when packets have not been encrypted, a start and an end of a frame are recognized through content of packets, and a frame size is calculated by summing sizes of all packets constituting the frame. On the other hand, when packets have been encrypted, a previously learned number of packets per frame is used to divide a frame into packets, and a frame size is calculated by summing sizes of all the packets.

Here, when packets are encrypted, packet sizes may change. However, since the packet sizes do not change randomly but change in proportion to each other, it is possible to calculate frame sizes by using the packet sizes and detect a motion by using a pattern of the frame sizes even when the packet sizes increase due to encryption. In other words, since a size of an encrypted packet is larger when a packet size is larger, it is possible to use the feature as is that a frame size is calculated from packet sizes and a motion is detected by using frame sizes even when packets are encrypted.

FIG. 4B shows a relationship between a frame size and the number of packets as a graph when a video is encoded and encrypted with a codec different from that of FIG. 4A and transmitted via a network. FIG. 4A shows that the numbers of packets are similar, that is, about 6.21, regardless of frame size. On the other hand, FIG. 4B, in which the codec different from that of FIG. 4A is used, shows that the number of packets tends to be in proportion to a frame size.

Referring to FIG. 4B, when a frame size is x and the number of packets per frame is y, it is possible to see that a proportional expression "y=0.0009x+0.307" holds between x and y. This is obtained through regression analysis, and it is possible to see that the square of a correlation coefficient R is 0.8264, which indicates a high degree of correlation.

As shown in FIGS. 4A and 4B, the number of packets constituting a frame shows a certain pattern according to a codec. Therefore, when the number of packets constituting a frame is learned through machine learning according to a codec, it is possible to calculate the number of packets constituting a frame by using the previously learned result and calculate a frame size even when encrypted packets are transmitted.

Figure 5A:
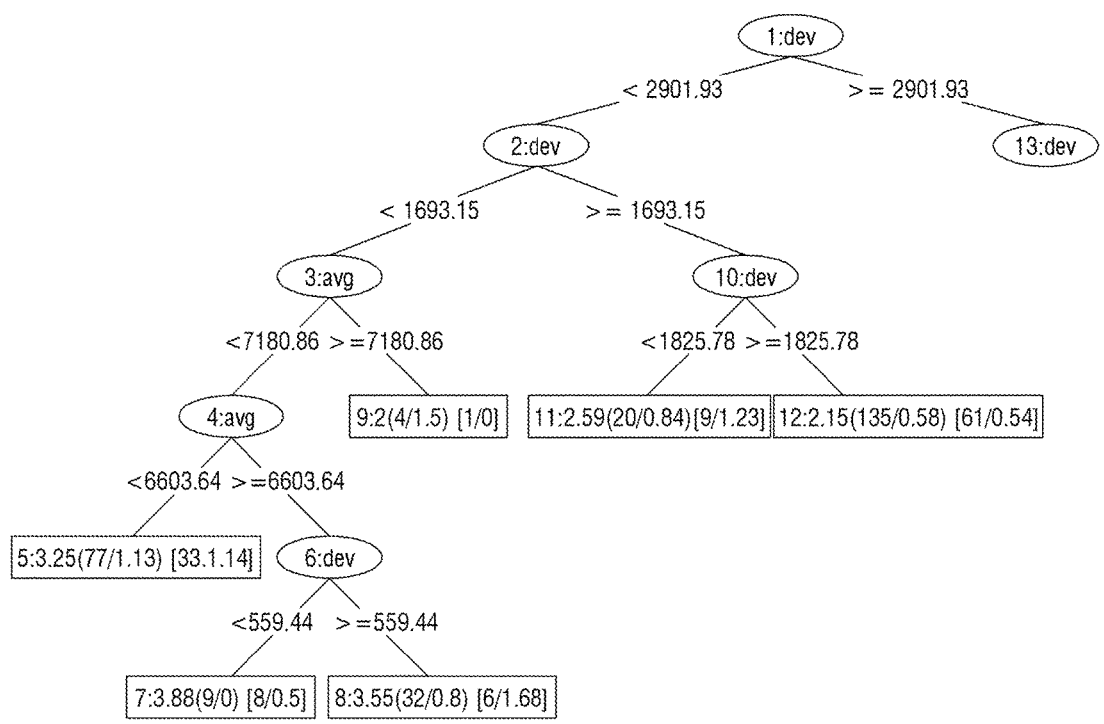
FIGS. 5A and 5B are diagrams illustrating a process of determining the degree of motion on the basis of a pattern of frame sizes according to an exemplary embodiment of the present disclosure.
Figure 5B:
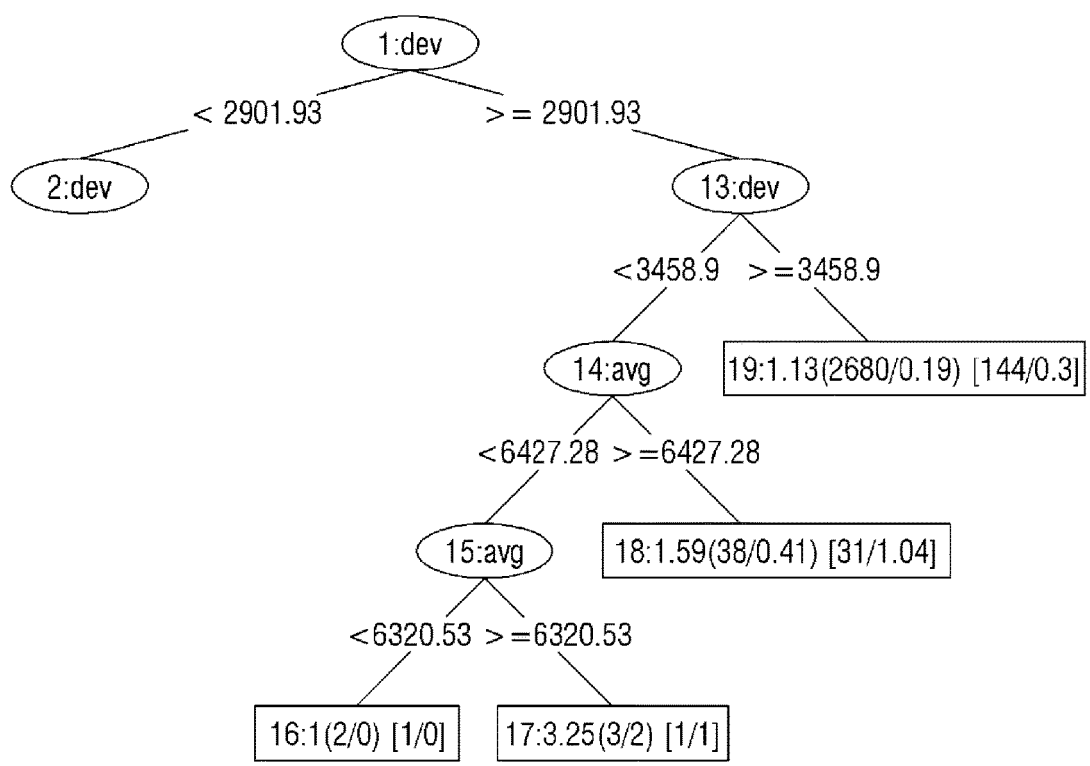

FIGS. 5A and 5B are diagrams illustrating a process of determining the degree of motion on the basis of a pattern of frame sizes according to an exemplary embodiment of the present disclosure.

FIGS. 5A and 5B show a decision tree generated on the basis of a video encoder VP8 and a real-time transport protocol (RTP) packet. Referring to FIGS. 5A and 5B, the degree of motion is classified as 1.13 to 3.88 on the basis of a deviation and an average. The deviation is indicated by dev, and the average is indicated by avg.

First, a first node branches to a second node and a 13th node according to whether a deviation of a frame size is equal to or larger than 2901.93. The second node corresponds to a case in which the deviation is smaller than 2901.93 and branches again to a third node and a $10^{th}$ node according to whether the deviation is equal to or larger than 1693.15.

The third node corresponds to a case in which the deviation is smaller than 1693.15 and branches again to a fourth node and a ninth node according to whether an average is equal to or larger than 7180.86. The fourth node corresponds to a case in which the average is smaller than 7180.86 and branches again to a fifth node and a sixth node according to whether the average is equal to or larger than 6603.64.

The fifth node is a leaf node and corresponds to a case in which the deviation is smaller than 1693.15 and the average is smaller than 6603.64. The degree of motion at the fifth node may be expressed as a value of 3.25. The sixth node corresponds to a case in which the average is equal to or larger than 6603.64 and branches again to a seventh node and an eighth node according to whether the deviation is equal to or larger than 559.44.

The seventh node is a leaf node and corresponds to a case in which the deviation is smaller than 559.44 and the average is equal to or larger than 6603.64 and smaller than 7180.86. The degree of motion at the seventh node may be expressed as a value of 3.88. The eighth node is a leaf node and corresponds to a case in which the deviation is equal to or larger than 559.44 and smaller than 1693.15 and the average is equal to or larger than 6603.64 and smaller than 7180.86. The degree of motion at the eighth node may be expressed as a value of 3.55.

The ninth node is a leaf node and corresponds to a case in which the deviation is smaller than 1693.15 and the average is equal to or larger than 7180.86. The degree of motion at the ninth node may be expressed as a value of 2. The $10^{th}$ node corresponds to a case in which the deviation is equal to or larger than 1693.15 and branches again to a $11^{th}$ node and a $12^{th}$ node according to whether the deviation is equal to or larger than 1825.78.

The $11^{th}$ node is a leaf node and corresponds to a case in which the deviation is equal to or larger than 1693.15 and smaller than 1825.78. The degree of motion at the $11^{th}$ node may be expressed as a value of 2.59. The $12^{th}$ node is a leaf node and corresponds to a case in which the deviation is equal to or larger than 1825.78 and smaller than 2901.93. The degree of motion at the $12^{th}$ node may be expressed as a value of 2.15.

The $13^{th}$ node corresponds to a case in which the deviation is equal to or larger than 2901.93 and branches again to a $14^{th}$ node and a $19^{th}$ node according to whether the deviation is equal to or larger than 3458.9. The $14^{th}$ node corresponds to a case in which the deviation is equal to or larger than 2901.93 and smaller than 3458.9 and branches again to a $15^{th}$ node and an $18^{th}$ node according to whether the average is equal to or larger than 6427.28.

The $15^{th}$ node corresponds to a case in which the average is smaller than 6427.28 and branches again to a $16^{th}$ node and a $17^{th}$ node according to whether the average is equal to or larger than 6320.53. The $16^{th}$ node is a leaf node and corresponds to a case in which the deviation is equal to or larger than 2901.93 and smaller than 3458.9 and the average is smaller than 6320.53. The degree of motion at the $16^{th}$ node may be expressed as a value of 1.

The $17^{th}$ node is a leaf node and corresponds to a case in which the deviation is equal to or larger than 2901.93 and smaller than 3458.9 and the average is equal to or larger than 6320.53 and smaller than 6427.28. The degree of motion at the $17^{th}$ node may be expressed as a value of 3.25. The $18^{th}$ node is a leaf node and corresponds to a case in which the deviation is equal to or larger than 2901.93 and smaller than 3458.9 and the average is equal to or larger than 6427.28. The degree of motion at the $18^{th}$ node may be expressed as a value of 1.59.

The $19^{th}$ node is a leaf node and corresponds to a case in which the deviation is equal to or larger than 3458.9. The degree of motion at the $19^{th}$ node may be expressed as a value of 1.13. Thus far, the decision tree of FIGS. 5A and 5B has been described. Conditions and the degrees of motion corresponding to individual nodes shown in FIGS. 5A and 5B are arranged in Table 2 below.

TABLE 2

| Node | Average | Deviation | Degree |
|---|---|---|---|
| Fifth node | avg < 6603.64 | dev < 1693.15 | 3.25 |
| Seventh node | 6603.64 ≤ avg < 7180.86 | dev < 559.44 | 3.88 |
| Eighth node | 6603.64 ≤ avg < 7180.86 | 559.44 ≤ dev < 1693.15 | 3.55 |
| Ninth node | 7180.86 ≤ avg | dev < 1693.15 | 2 |
| $11^{th}$ node | — | 1693.15 ≤ dev < 1825.78 | 2.59 |
| $12^{th}$ node | — | 1825.78 ≤ dev < 2901.93 | 2.15 |
| $16^{th}$ node | avg < 6320.53 | 2901.93 ≤ dev < 3458.9 | 1 |
| $17^{th}$ node | 6320.53 ≤ avg < 6427.28 | 2901.93 ≤ dev < 3458.9 | 3.25 |
| $18^{th}$ node | 6427.28 ≤ avg | 2901.93 ≤ dev < 3458.9 | 1.59 |
| $19^{th}$ node | — | 3458.9 ≤ dev | 1.13 |

In this way, through machine learning, the VA apparatus may learn in advance a frame size and the number of packets constituting a frame for each codec. Also, the VA apparatus may provide the degree of motion as a value on the basis of an average and a deviation for each codec. However, this is an example for helping understanding, and the examples of FIGS. 4A and 4B and FIGS. 5A and 5B may vary according to a codec.

In brief, whether there is a motion is determined by using an average and deviations of frame sizes, and when there is a motion, even the degree of motion is quantified by using the average and deviations of the frame sizes and provided. Then, even when a corresponding video is not decoded to compare images, it is possible to rapidly know much information on a motion with only packets without high computing power.

Figure 6:
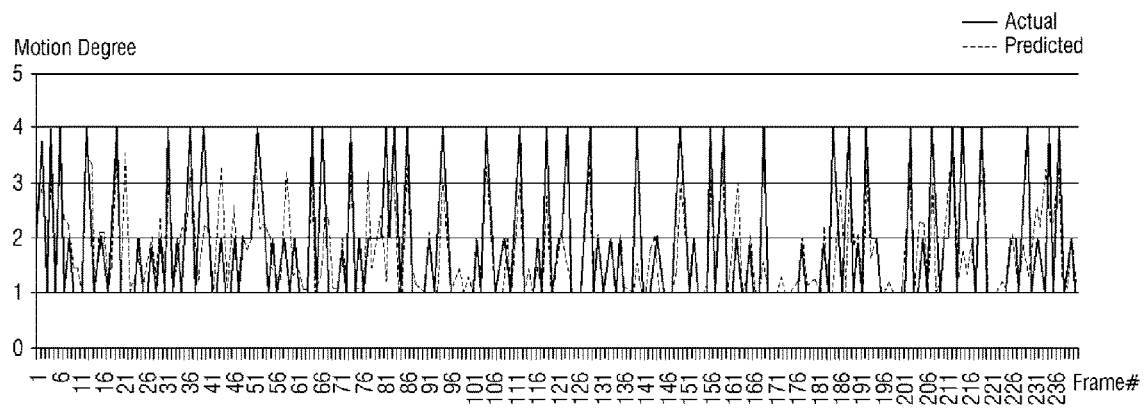
FIG. 6 is a graph comparatively illustrating the degree of motion resulting from related image analysis and the degree of motion resulting from an exemplary embodiment of the present disclosure.

FIG. 6 is a graph comparatively illustrating the degree of motion resulting from related image analysis and the degree of motion resulting from an exemplary embodiment of the present disclosure.

Referring to FIG. 6, it is possible to comparatively see a related result (ground truth) of determining the degree of motion after decoding a video and comparing images to detect a motion, and an inventive result of determining the degree of motion after detecting a motion on the basis of only frame sizes.

Referring to FIG. 6, the two results are similar to each other and do not show a large difference therebetween. Every second, it may be determined whether there is a motion, and the degree of motion may be quantified and compared. Then, it is possible to see that the method proposed in the present disclosure makes it possible to rapidly obtain the result without large difference with lower computing power than the related method.

FIGS. 7A to 7C illustrate experimental results of a VA method according to an exemplary embodiment of the present disclosure.

FIG. 7A shows a table in which results of applying the VA method proposed in the present disclosure to an actual CCTV video as an example are arranged. Referring to a correlation coefficient of FIG. 7A, the correlation coefficient shows an accuracy of 73.79%. In FIG. 7B, it is possible to see how useful this accuracy is.

FIG. 7B shows a table in which accuracy of VA and meanings of the accuracy are arranged. In VA, an accuracy of 51 to 60 is generally evaluated to be a reasonable grade or an acceptable grade. An accuracy of 60 to 70 is evaluated to be a moderate grade.

Also, an accuracy of 70 to 80 is evaluated to be a good grade. An accuracy of 80 to 90 is evaluated to be a very high grade. An accuracy of 90 or more is evaluated to be an excellent grade. The method proposed in the present disclosure shows the accuracy of about 73%, which corresponds to the good grade.

Since such accuracy is obtained by only analyzing packets of frames without decoding a video, the VA method has excellent performance. Also, the VA method does not require high computing power and thus may further improve efficiency of a related VA method when the VA method is used as a preprocessing operation for applying the related method in combination with an existing camera at a transmitting end or an existing VA apparatus at a receiving end.

Referring to FIG. 7C, it is possible to see accuracy when packets are not encrypted (open) and accuracy when packets are encrypted (encryption). When video packets transmitted via a network are encrypted, it is not possible to know starts and ends of frames directly from content of the packets. In this case, a video encoding codec and a transmission attribute are input as defined by a user, and a previously machine-learned model corresponding thereto is loaded to use the number of packets per frame.

Then, although it is not possible to know starts and ends of frames directly from the packets, it is possible to calculate frame sizes and analyze a pattern by using the machine-learned number of packets per frame. Referring to FIG. 7C, when packets are encrypted, accuracy is averagely lowered by about 4 to 5% compared to a case in which packets are not encrypted, but the accuracy is still good.

In particular, in the method proposed in the present disclosure, even when packets are encrypted, frames are analyzed without decrypting the encrypted packets. Therefore, by considering that costs for the process of decrypting encrypted packets are saved, it is possible to know that the accuracy of 67.03 to 70.73% is high. This corresponds to accuracy of about 94% relative to 71 to 74% of the case in which packets are not encrypted.

The method proposed in the present disclosure enables a network to determine whether there is a motion in video frames only through packets. In this way, it is possible to reduce a transmission amount by dropping some frames and then transmitting packets, and it is possible to improve storage efficiency by dropping some frames and then storing packets after the packets are transmitted.

However, when frames with no motion are dropped and a corresponding video is analyzed according to a related method, accuracy should not be degraded due to dropped frames. When the method proposed in the present disclosure is used as a preprocessing operation of a related method, influence on the accuracy of the related method will be described with reference to FIG. 8.

Figure 8:
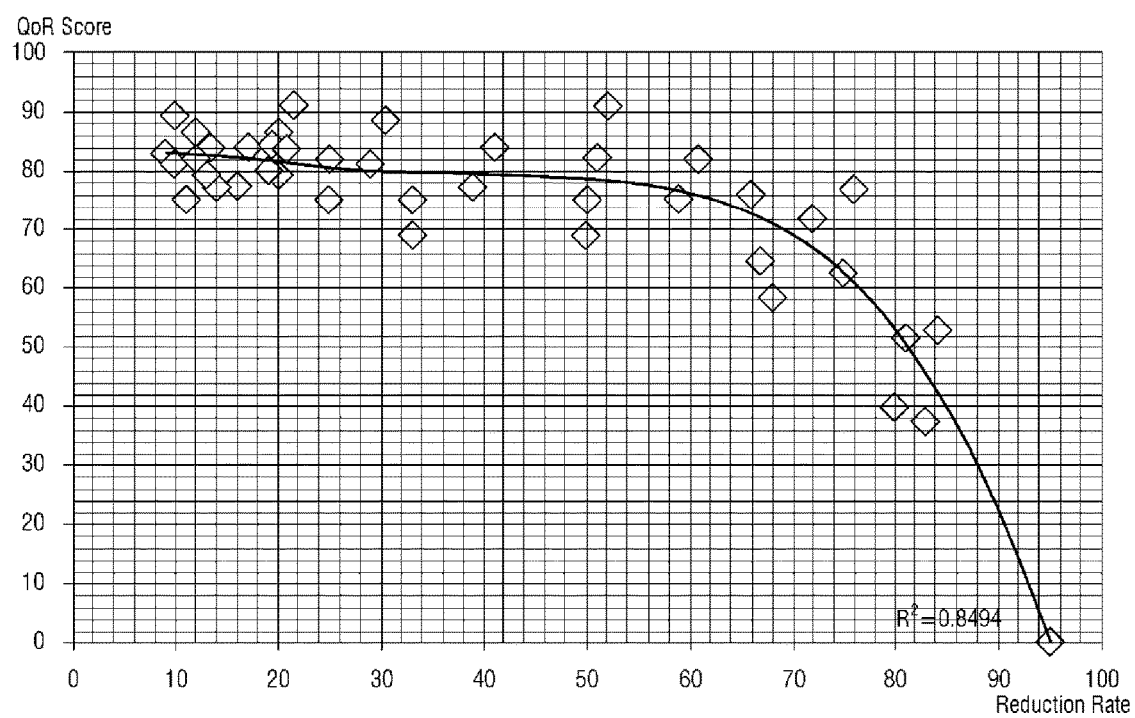
FIG. 8 is a graph illustrating influence on the accuracy of related video recognition when frames are dropped according to a method proposed in the present disclosure.

FIG. 8 is a graph illustrating influence on the accuracy of related video recognition when frames are dropped according to the method proposed in the present disclosure.

The more video frames are reduced, the more an information amount is reduced. This leads to degradation of accuracy. In FIG. 8, the horizontal axis denotes a frame reduction rate, and the vertical axis denotes a quality of recovery (QoR) score. Referring to FIG. 8, when the frame reduction rate continuously increases, accuracy is lowered and reaches 0.

When a target of accuracy is the good grade of FIG. 7B, it is required to keep accuracy at about 70 to 80%. Referring to a section corresponding to an accuracy of 70 to 80% in FIG. 8, it is possible to obtain 70% accuracy even when about 68% of frames are dropped. In other words, even when the present disclosure is used in combination with a related VA method, there is no significant influence on accuracy.

To sum up, a related VA method is limited to video processing power of about 5 FPS. However, when it is determined in advance whether there is a motion and frames are dropped according to the method proposed in the present disclosure, it is possible to maintain the good grade even by dropping about 68% of frames.

Therefore, even when a network camera capturing a video at about 15 FPS drops a maximum of 68% frames and transfers only about 5 FPS to a related VA apparatus, it is possible to improve VA efficiency without having significant influence on accuracy. Also, it is possible to improve network transmission efficiency of a transmitting end and storage efficiency of a receiving end without affecting accuracy.

Thus far, the video analysis method proposed in the present disclosure and based on pattern analysis of network packets of a real-time video streaming service has been described with reference to FIGS. 2 to 8. When the method proposed in the present disclosure is used, it is possible to remarkably reduce a calculation amount at a receiving end. Therefore, the price of a product is lowered, and competitiveness thereof may be improved.

Also, it is possible to apply the VA method to a transmitting end or a receiving end regardless of a type of codec. Further, since only network packet information is used, the VA method has high applicability and transplantation ability. Moreover, since unnecessary video frames may be dropped, it is possible to reduce a network transmission amount and improve efficiency of a storage device.

Figure 9:
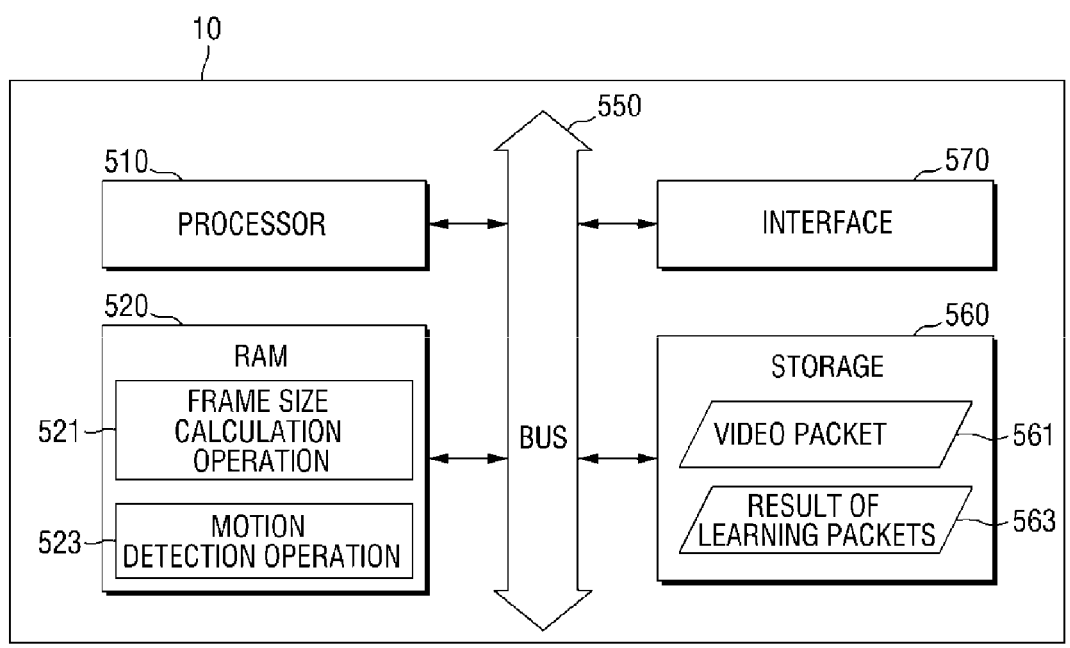
FIG. 9 is a hardware configuration diagram of a VA apparatus based on pattern analysis of network packets of a real-time video streaming service according to an exemplary embodiment of the present disclosure.

FIG. 9 is a hardware configuration diagram of a VA apparatus based on pattern analysis of network packets of a real-time video streaming service according to an exemplary embodiment of the present disclosure.

Referring to FIG. 9, a VA apparatus 10 proposed in the present disclosure and based on pattern analysis of network packets of a real-time streaming service may include at least one processor 510, a memory 520, a storage 560, and an interface 570. The processor 510, the memory 520, the storage 560, and the interface 570 exchanges data via a system bus 550.

The processor 510 executes a computer program loaded onto the memory 520, and the memory 520 loads the computer program from the storage 560. The computer program may include a video packet collection operation (not shown), a frame size calculation operation 521, and a motion detection operation 523.

First, the video packet collection operation (not shown) involves receiving video packets which are transmitted in real time from a camera via the interface 570 and storing the received video packets as video packets 561 in the storage 560.

The frame size calculation operation 521 involves loading the video packets 561 stored in the storage 560 onto the memory 520 via the system bus 550. Subsequently, when the video packets 561 have not been encrypted, markings which indicate starts and ends of frames are searched for through packet information. Packets belonging to one frame are selected by using the markings, and a frame size is calculated by summing all sizes of the selected packets.

When the video packets 561 have been encrypted, the frame size calculation operation 521 involves loading results 563 previously machine-learned for individual codecs and determining how many packets belong to one frame according to a corresponding codec. Then, all sizes of the corresponding number of packets are summed to calculate frame sizes.

The motion detection operation 523 involves generating statistical information, such as an average, deviations, and the like, from the frame sizes. Also, a pattern of frame sizes is analyzed. A pattern of frame sizes denotes a minimum, a maximum, a period, and the like of frame sizes. The pattern of frame sizes is used to determine whether there is a motion.

Also, when there is a motion, the motion detection operation 523 involves quantifying the degree of motion as necessary by using a decision tree previously machine-learned according to the corresponding codec.

When the VA apparatus 10 based on pattern analysis of network packets of a real-time streaming service is combined with a transmitting end, such as a camera which captures a video, frames with no motion are dropped according to results of the motion detection operation 523, and only frames with a motion are transmitted to a related VA apparatus via a network.

Also, when the VA apparatus 10 based on pattern analysis of network packets of a real-time streaming service is combined with an apparatus for receiving a video via a network and analyzing the video in real time, it is possible to improve VA efficiency by dropping frames with no motion and transferring only frames with a motion to the analysis apparatus as a preprocessing operation before application of a related VA method. In addition, when only frames with a motion are stored, it is possible to improve efficiency of a storage.

Each component of FIG. 9 may denote software or hardware, such as a field programmable gate array (FPGA) or an application-specific integrated circuit (ASIC). However, the components are not limited to software or hardware and rather may be configured to reside in an addressable storage medium or to execute one or more processors. Functionality provided within the components may be implemented by subdivided components or one component which is composed of a plurality of components to perform a specific function.

What is claimed is:

1. A video analysis (VA) method comprising:
calculating, by a VA apparatus, a size of each of a plurality of frames by summing sizes of a plurality of packets constituting each of the plurality of frames;
analyzing, by the VA apparatus, the size of each of the plurality of frames constituting a video to determine a size pattern of the plurality of frames; and
determining, by the VA apparatus, whether there is a motion in the video based on the size pattern,
wherein the analyzing comprises calculating three or more among an average, a deviation, a minimum, a maximum, and a period of the plurality of frames, and
wherein the determining comprises determining that there is no motion in the video in response to the minimum and the maximum periodically repeating, and determining that there is the motion in the video in response to the minimum and the maximum not periodically repeating.

2. The VA method of claim 1, wherein the calculating the size of each of the plurality of frames comprises detecting for each of the plurality of frames, when packets of the video have not been encrypted, a packet including marker information indicating a start of a frame to a packet including marker information indicating an end of the frame as the plurality of packets constituting the frame.

3. The VA method of claim 1, wherein the calculating the size of each of the plurality of frames comprises detecting, when packets of the video have been encrypted, packets corresponding to a number of packets per frame, the number of packets per frame being previously machine-learned according to a codec of the video.

4. The VA method of claim 1, wherein the determining further comprises determining that there is no motion in the video in response to the average being within a preset threshold value from an average of the minimum and the maximum.

5. The VA method of claim 1, wherein the determining further comprises determining that there is no motion in the video in response to the deviation being less than a preset threshold value.

6. The VA method of claim 1, wherein the determining further comprises determining that there is the motion in the video in response to the average being within a preset threshold value from the minimum.

7. The VA method of claim 1, wherein the determining further comprises determining that there is the motion in the video in response to the deviation being equal to or greater than a preset threshold value.

8. The VA method of claim 1, wherein the determining further comprises quantifying a degree of the motion based on a decision tree previously machine-learned according to a codec of the video in response to the determining indicating that there is the motion in the video, and
the decision tree has an average and a deviation of the plurality of frames as input variables and has the quantified degree of the motion as a target variable.

9. The VA method of claim 1, further comprising dropping frames with no motion from the video.

10. The VA method of claim 9, further comprising transmitting the video from which the frames with no motion have been dropped via a network.

11. The VA method of claim 9, further comprising storing the video from which the frames with no motion have been dropped in a storage.

12. A video analysis (VA) apparatus comprising:
a memory configured to store a computer program; and
at least one processor configured to read and execute the computer program,
wherein the computer program comprises:
frame size calculating instructions configured to cause the at least one processor to calculate a size of a frame by summing sizes of a plurality of packets constituting the frame; and
motion detection instructions configured to cause the at least one processor to analyze a pattern of sizes of a plurality of frames constituting a video by analyzing the size of each of the plurality of frames, and determine whether there is a motion in the video based on the pattern,
wherein the analyzing comprises calculating three or more among an average, a deviation, a minimum, a maximum, and a period of the plurality of frames, and
wherein the determining comprises determining that there is no motion in the video in response to the minimum and the maximum periodically repeating, and determining that there is the motion in the video in response to the minimum and the maximum not periodically repeating.

13. A non-transitory computer-readable medium having stored thereon a computer program, which when executed by a processor of a video analysis (VA) apparatus, causes the VA apparatus to:
calculate a size of a frame by summing a size of each of a plurality of packets constituting the frame;
analyze a pattern of sizes of a plurality of frames constituting a video by analyzing the size of each of the plurality of frames; and
determine whether there is a motion in the video based on the pattern,
wherein the analyzing comprises calculating three or more among an average, a deviation, a minimum, a maximum, and a period of the plurality of frames, and
wherein the determining comprises determining that there is no motion in the video in response to the minimum and the maximum periodically repeating, and determining that there is the motion in the video in response to the minimum and the maximum not periodically repeating.

* * * * *